(12) United States Patent
Takei

(10) Patent No.: US 7,611,192 B2
(45) Date of Patent: Nov. 3, 2009

(54) COVER FOR FRONT COMPARTMENT OF VEHICLE BODY AND FRONT SECTION STRUCTURE OF VEHICLE BODY

(75) Inventor: Daisuke Takei, Fuji (JP)

(73) Assignee: Nihon Plast Co., Ltd, Fuji-Shi, Shizuoka-Ken (JP)

( * ) Notice: Subject to any disclaimer, the term of this patent is extended or adjusted under 35 U.S.C. 154(b) by 0 days.

(21) Appl. No.: 12/236,845

(22) Filed: Sep. 24, 2008

(65) Prior Publication Data

US 2009/0085374 A1    Apr. 2, 2009

(30) Foreign Application Priority Data

Sep. 28, 2007    (JP) .............................. 2007-255323

(51) Int. Cl.
*B60R 21/34* (2006.01)
(52) U.S. Cl. ............................. 296/187.04; 296/187.09; 296/193.11; 180/69.2; 174/544
(58) Field of Classification Search ............ 296/187.04, 296/187.09, 192, 193.11, 37.1; 180/69.2, 180/69.21; 123/198 E; 174/544
See application file for complete search history.

(56) References Cited

U.S. PATENT DOCUMENTS

| 4,152,021 A | * | 5/1979 | Gotz et al. ................. 296/37.1 |
| 5,417,471 A | * | 5/1995 | Kreis et al. ............ 296/203.02 |
| 6,086,144 A | * | 7/2000 | Kuwano ..................... 296/192 |
| 6,565,148 B1 | * | 5/2003 | Teramoto et al. ............ 296/192 |

FOREIGN PATENT DOCUMENTS

| EP | 2036787 A2 | * | 3/2009 |
| FR | 2879539 A1 | * | 6/2006 |
| JP | 2000308234 A | * | 11/2000 |
| JP | 2005-053269 | | 3/2005 |
| JP | 2005057842 A | * | 3/2005 |
| WO | WO-2006/051072 A1 | * | 5/2006 |

OTHER PUBLICATIONS

Machine Translation of WO2006/051072.*

* cited by examiner

*Primary Examiner*—Jason S Morrow
(74) *Attorney, Agent, or Firm*—NDQ&M Watchstone LLP

(57) ABSTRACT

A cover is provided between a front hood and a vehicle component. The cover includes a cover main portion, a lid, a supporting portion, a supported portion, and a contacting portion. An opening is formed on the cover main portion. The supporting portion is integrally provided on the cover main portion and around the opening. The supported portion is integrally provided on a circumferential edge of the lid and engaged with the supporting portion. The contacting portion is provided on the lid and receives a downward load from the front hood. One or both of the supporting portion and the supported portion deforms elastically in case where a load has been applied to the contacting portion and thereby the lid drops off within the opening. According to the cover, a deformable amount of the cover can be increased and maintenance costs can be reduced.

4 Claims, 11 Drawing Sheets

COVER FOR FRONT COMPARTMENT OF VEHICLE BODY AND FRONT SECTION STRUCTURE OF VEHICLE BODY

BACKGROUND OF THE INVENTION

1. Field of the Invention

The present invention relates to a cover for a front compartment of a vehicle body and to a front section structure of the vehicle body.

2. Description of the Related Art

Various vehicle components such as an engine or a battery are provided within a front compartment (occasionally, it is also called as an engine compartment) located in a front section of a vehicle body. An upper opening of the front compartment is covered by a front hood which can be opened and closed.

In a case where an object has hit a front end of the vehicle body while the vehicle is running, the object may run on the front hood and then the front hood may be bent downward. In this case, if a vehicle component having high stiffness is located beneath the front hood, the object may hit onto the vehicle component with interposing the front hood therebetween. Therefore, a structure for reducing an impact force to the object is desired.

In a Japanese Patent Application Laid-Open Publication No. 2005-53269, disclosed is a box covering vehicle components for preventing exposure of the vehicle components to rainwater. In case where an front hood has been bent downward after an impact of an object and then the object hits on the box, the box will be shrunk telescopically or accordion-folded by an impact load in order to increase a bent amount of the front hood. Specifically, the box includes upper and lower casings constructing a structure in which perforated slits are formed around a circumferential side wall of the lower casing. Therefore, the lower casing breaks off at the slits when the impact load has applied to the upper casing and thereby an upper section of the lower casing above the slits moves downward. In addition, a casing main body and the upper case, which are combined with the lower casing, also move downward. As a result, the bent amount of the front hood can be increased.

SUMMARY OF THE INVENTION

According to the above-mentioned structure, since the bent amount of the front hood can be increased due to a break-off of the box, replacement of the box must be needed after the break-off and thereby maintenance costs must increase.

Therefore, an object of the present invention is to provide a cover for a front compartment of a vehicle body and a front section structure of the vehicle body that can increase a deformable amount of a front hood and also reduce maintenance costs.

A first aspect of the present invention provides a cover that is provided between a front hood and a vehicle component provided beneath the front hood in order to cover the vehicle component. The cover includes a cover main portion on which an opening is formed, a lid for covering the opening, a supporting portion integrally provided on the cover main portion and around the opening, a supported portion integrally provided on a circumferential edge of the lid for being engaged with the supporting portion, and a contacting portion upwardly projected from the lid toward the front hood. The vehicle component can be reached through the opening. The contacting portion receives a downward load from the front hood. At least one of the supporting portion and the supported portion deforms elastically to drop off the lid within the opening in case where a load equal-to or more-than a predetermined value has been applied to the contacting portion.

A second aspect of the present invention provides a front section structure of a vehicle body that includes a front hood for covering a front compartment of the vehicle body and the above-described cover. The contacting portion is contacted with an under surface of the front hood directly or indirectly.

According to the first or second aspect of the present invention, since the contacting portion is provided, an unexpected upward separation of the lid is prevented. In addition, the lid drops off within the opening of the cover main portion in case where when a downward load equal-to or more-than a predetermined value has been applied from the front hood to the contacting portion at an object running on the front hood. Therefore, a deformable amount of the front hood can be increased and thereby an impact force to the object can be reduced. Here, since the cover (the cover main portion and the lid) is not broken, the cover can be installed again. Since the cover can be re-used only by re-installation, maintaining costs can be reduced.

It is preferable that a sealing lip attached at an upper edge of the contacting portion for sealing a gap between the upper edge of the contacting portion and an under surface of the front hood.

In this configuration, since the sealing lip is provided, the front hood contacts with the contacting portion of the lid with interposing the sealing lip at the object running on the front hood. Therefore, an impact load is not rapidly applied between the supported portion of the lid and the supporting portion of the cover main portion. As a result, breakage of the lid or the cover main portion tends not to occur.

DETAILED DESCRIPTION OF THE EMBODIMENT

Hereinafter, preferable embodiments according to the present invention will be described with reference to drawings.

First Embodiment

First, a first embodiment according to the present invention will be described with reference to FIGS. 1 to 8.

Figure 1:
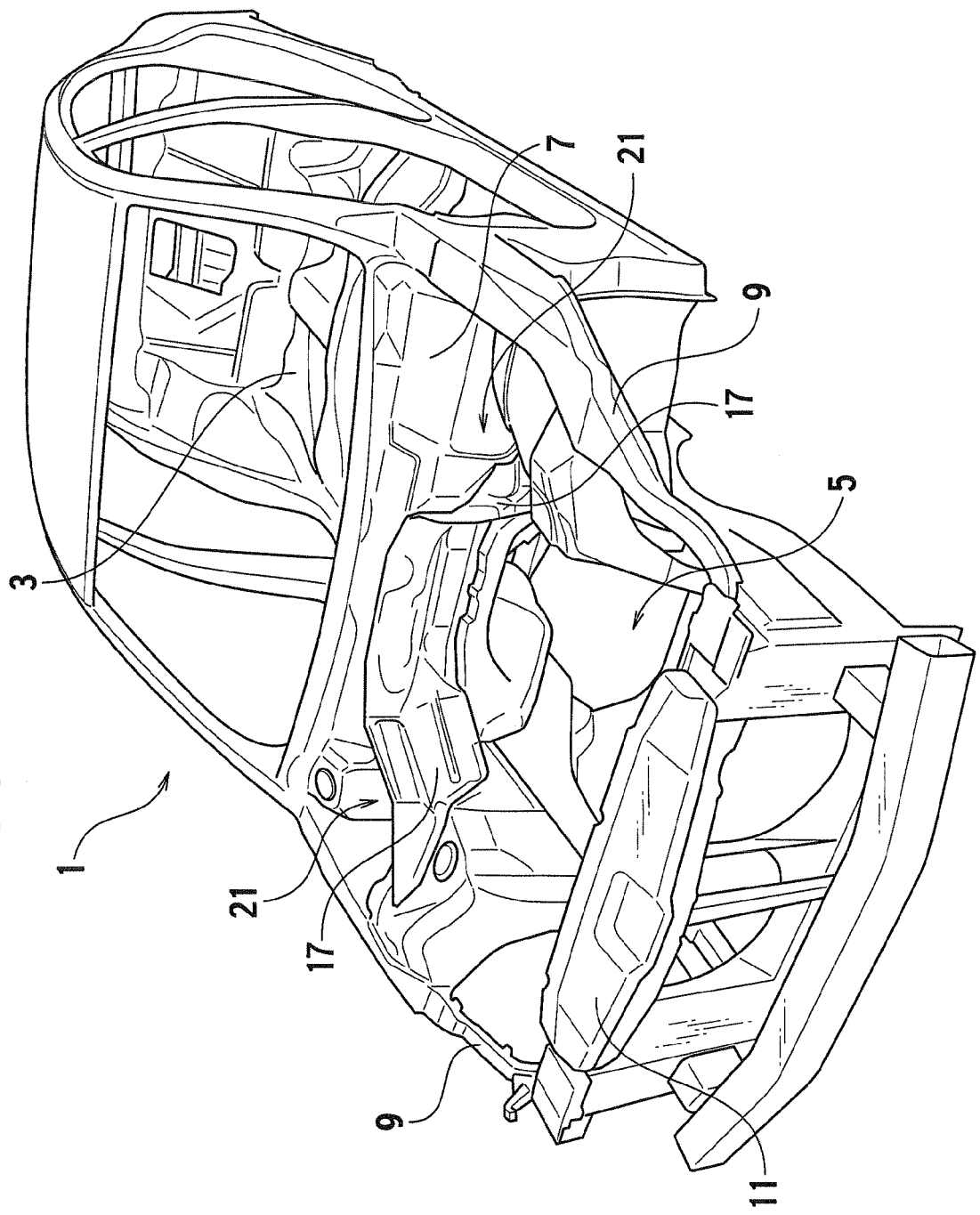
FIG. 1 is a perspective view showing a front section structure of a vehicle body in which a first embodiment of a cover according to the present invention is to be installed.

As shown in FIG. 1, a passenger compartment 3 and a front compartment (engine compartment) 5 of a vehicle 1 are sectioned by a dash panel 7.

The engine compartment 5 is segmented by the dash panel 7, a pair of front side members 9 and a radiator-core support 11. The pair of front side members 9 extends forward from both side ends of the dash panel 7. The radiator-core support 11 connects each end of the front side members 9. An engine 13 as a driving source of the vehicle 1 and its supplemental components are provided within the engine compartment 5. An upper opening of the engine compartment 5 is covered by a front hood 15 (not shown in FIG. 1), which can be opened and closed.

Figure 2:
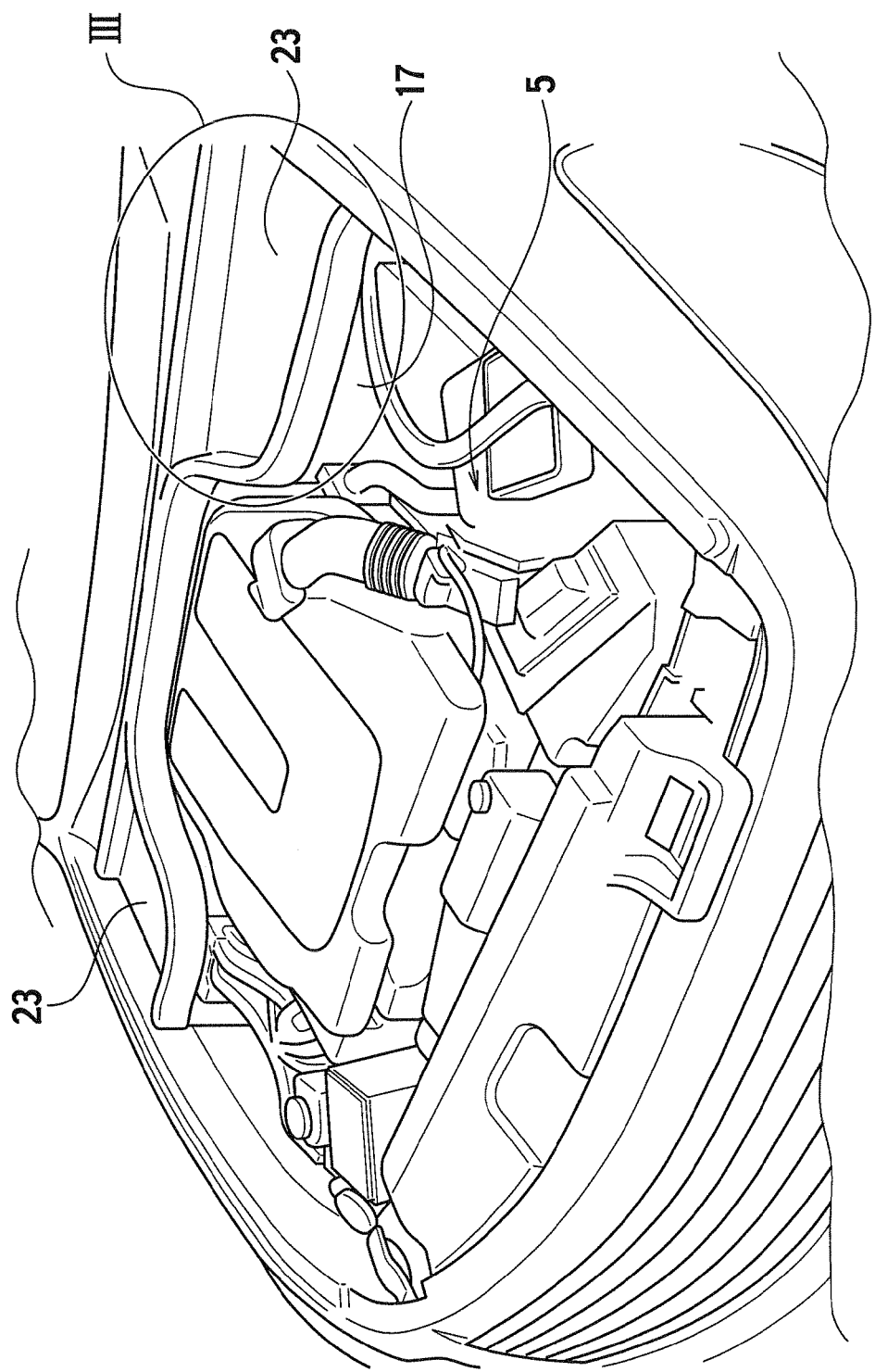
FIG. 2 is a perspective view of the front section with a front hood opened.

Within the engine compartment 5, a sub dash panel 17 is provided in front of the dash panel 7. The sub dash panel 17 segments a sub compartment 21 for electronic components, such as a battery 19 (see FIG. 7), with the dash panel 7. The electronic components should be away from water. As shown in FIG. 2, an upper opening of the sub compartment 21 is to be covered by a cover 23.

Next, the cover 23 will be described with reference to FIGS. 3 to 8.

Figure 3:
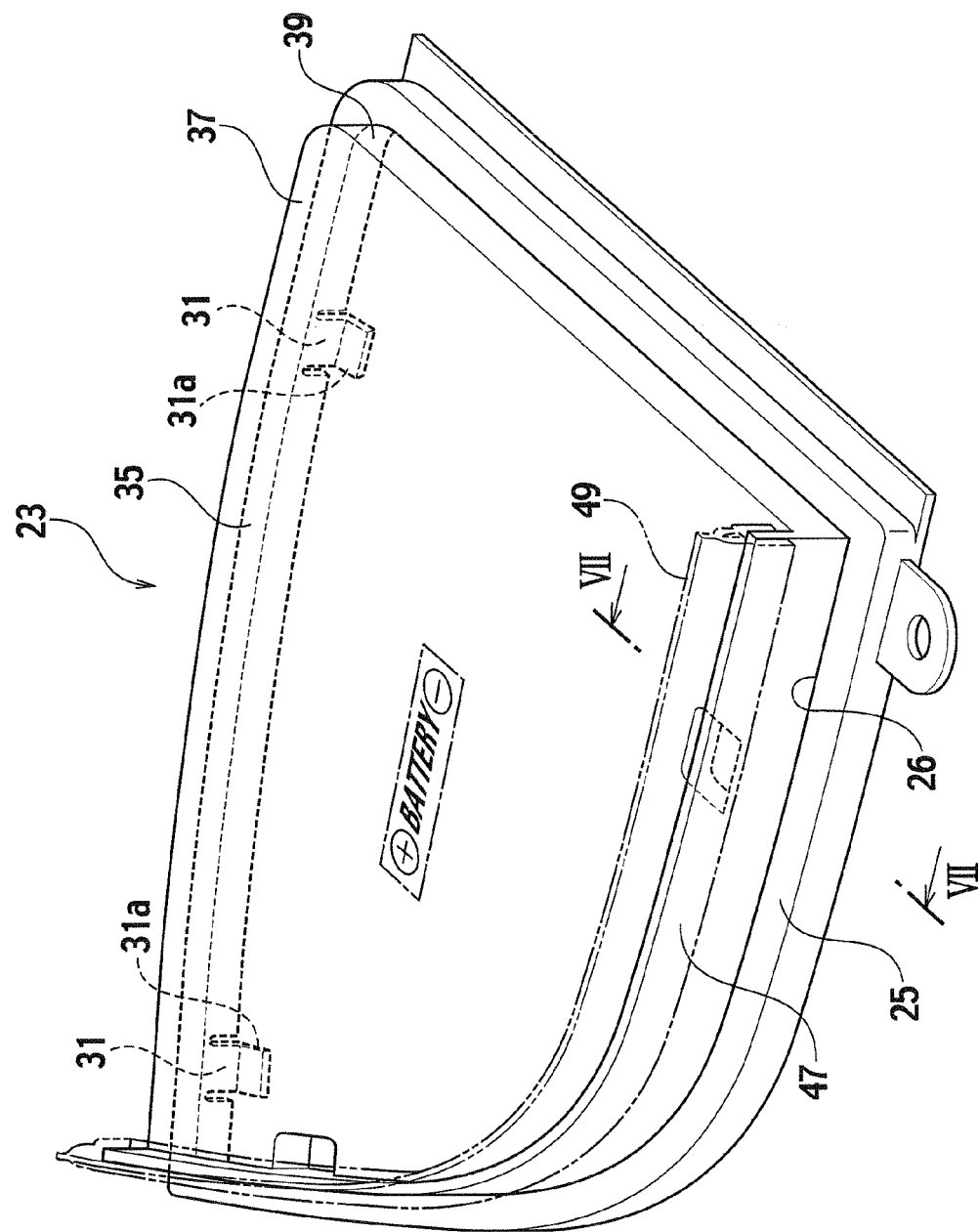
FIG. 3 is a perspective view of the cover (area III shown in FIG. 2)

The cover 23 located above vehicle component 19 and below the front hood 15 covering the upper opening of the engine compartment 5 (see FIG. 7). As shown in FIG. 3, the cover 23 includes a cover main frame (cover main portion) 25 and a lid 35 which covers an opening 26 of the cover main frame 25.

The cover main frame 25 is fixed via brackets or directly onto a vehicle body by fastening means such as screws. The vehicle component 19 in the sub compartment 21 can be reached through the opening 26 of the cover main frame 25 after removing the lid 35 from the opening 26.

Figure 4:
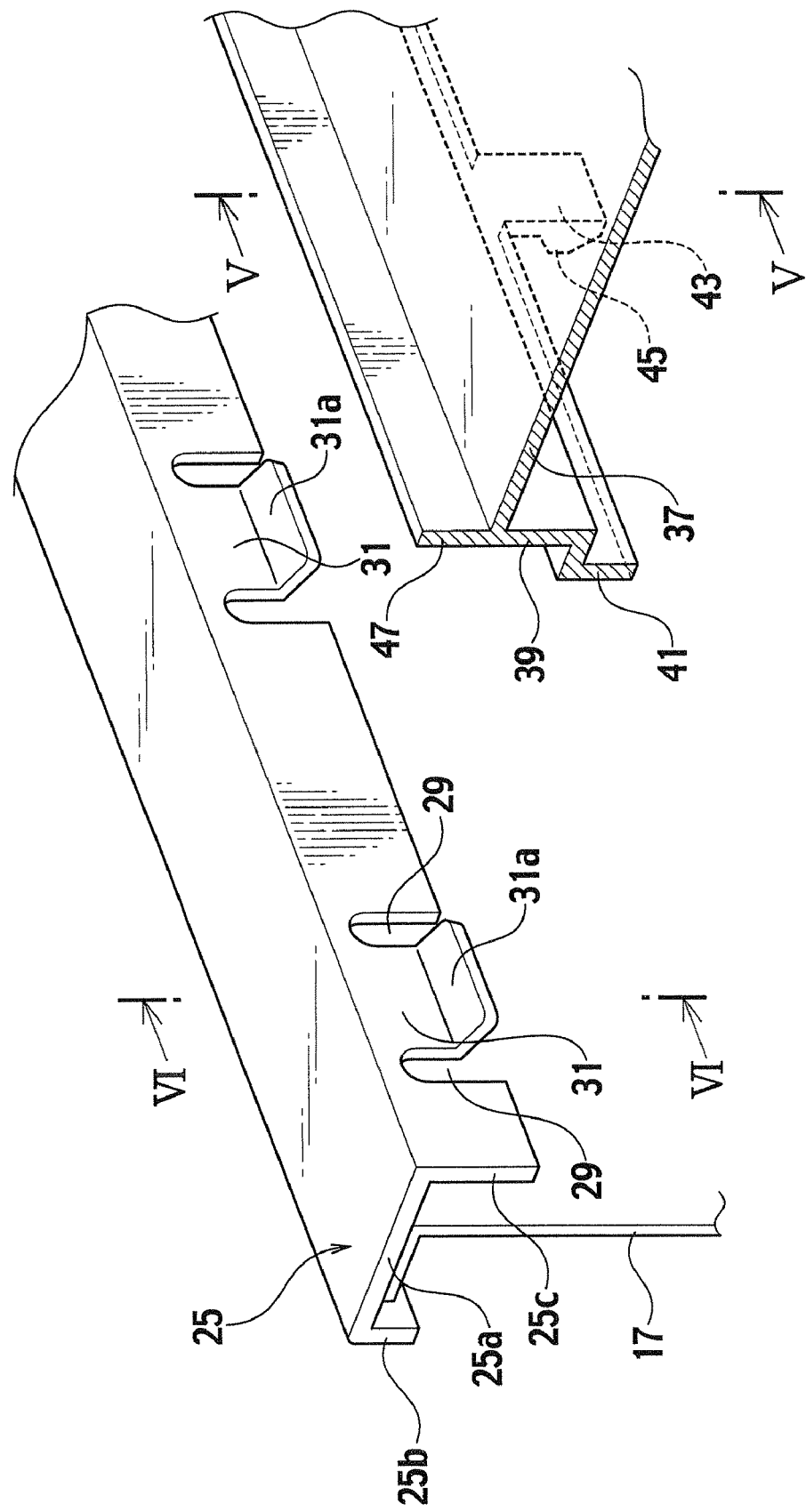
FIG. 4 is an exploded perspective view of the cover.
Figure 5:
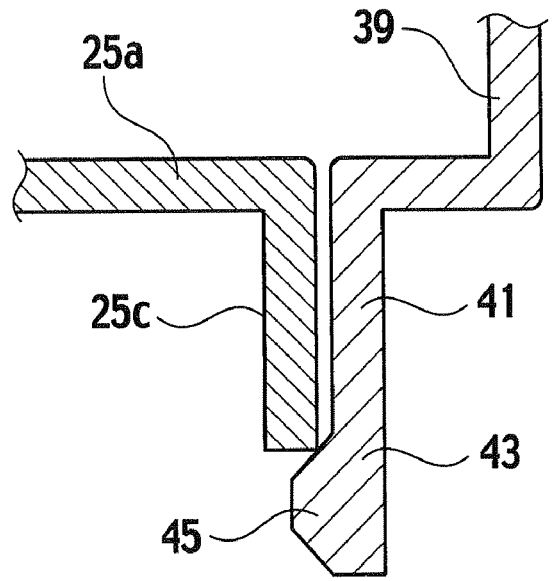
FIG. 5 is a cross-sectional view taken along a line V-V shown in FIG. 4.
Figure 6:
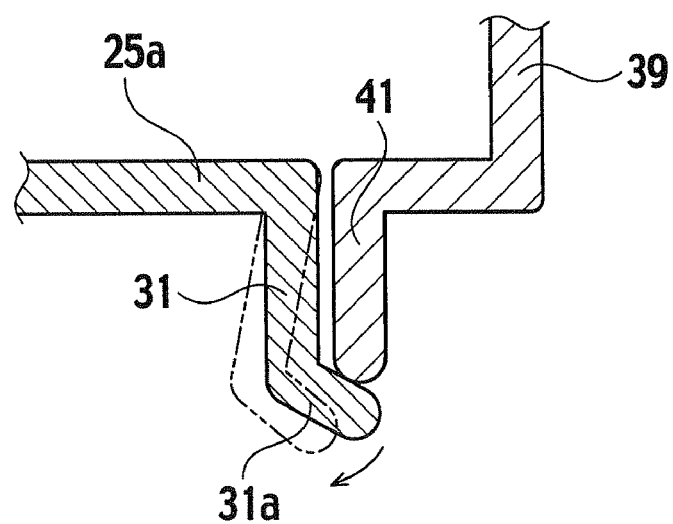
FIG. 6 is a cross-sectional view taken along a line VI-VI shown in FIG. 4.
Figure 7:
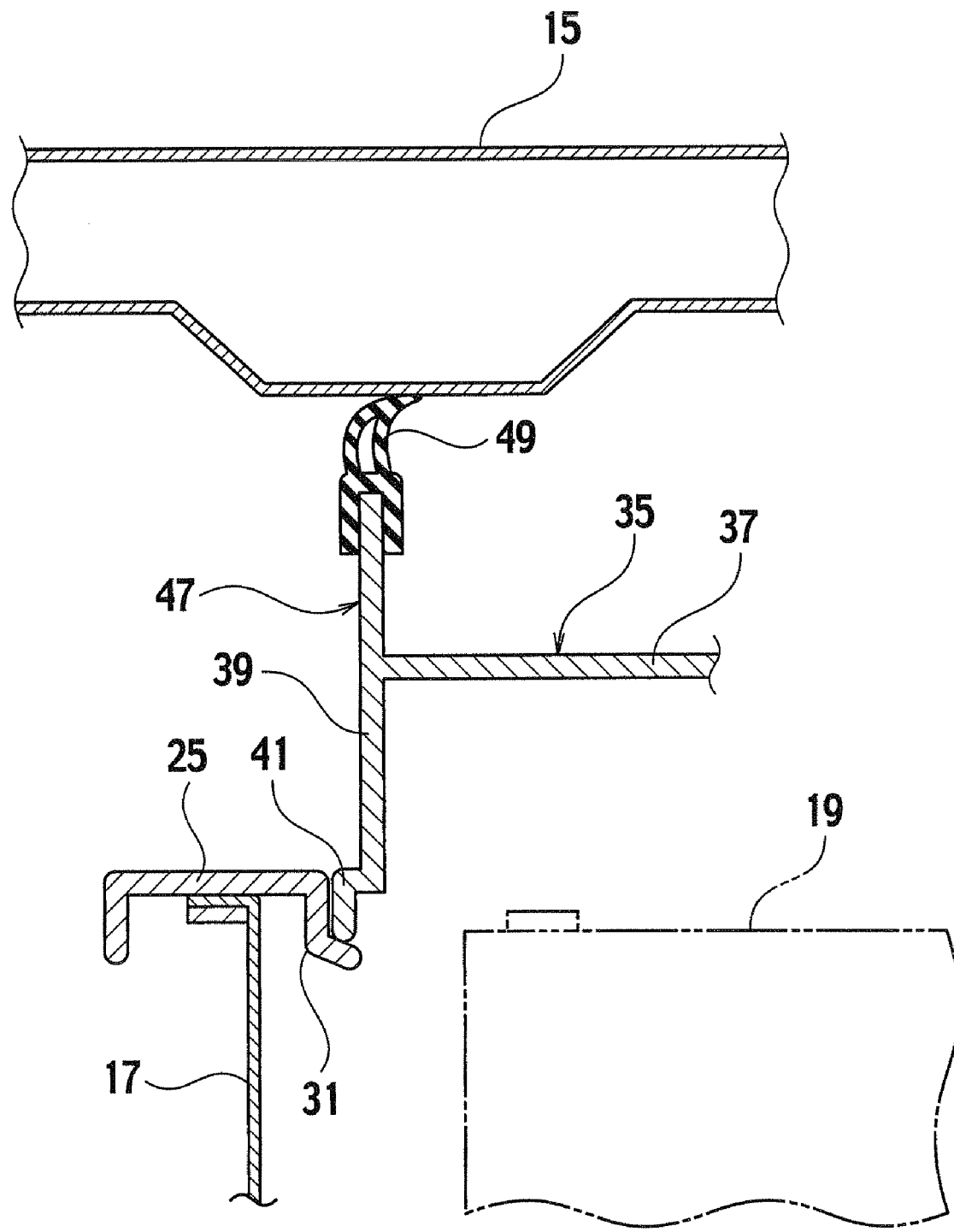
FIG. 7 is a cross-sectional view (normal state) taken along a line VII-VII shown in FIG. 3.

As shown in FIGS. 4 and 7, the cover main frame 25 has an almost U-angled cross-sectional shape. In other words, the cover main frame 25 is composed of an upper wall 25a, an outer wall 25b extending downward from an outer edge of the upper wall 25a and an inner wall 25c extending downward from an inner edge of the upper wall 25a. Pairs of slits 29 are provided on the inner wall 25c at predetermined intervals. A tab 31 is formed as a supporting portion between each pair of the slits 29. The tab 31 has elastic deformability. A shelf 31a is formed at each lower end of the tabs 31. Each of the shelves 31a extends toward the center of the cover main frame 25 with being inclined downward. The lid 35 can be laid on the shelves 31a (see FIG. 6). Specifically, when the lid 35 has been set into the opening 26 of the cover main frame 25, the lid 35 is supported by the shelves 31a (see FIG. 6).

As shown in FIGS. 4 and 7, the lid 35 is composed of a top panel 37, a circumferential wall 39 extending downward from a circumferential edge of the top panel 37 and a foot wall 41 connected to a lower edge of the circumferential wall 39. The foot wall (supported portion) 41 has an almost L-shaped cross-section and a slightly larger outline than the circumferential wall 39. The foot wall 41 is supported by the shelves 31a (see FIG. 6).

As shown in FIG. 4, snap tabs 43 are projected downward from a lower edge of the foot wall 41. A pawl 45 is formed on a lower outer surface of each snap tab 43 for preventing the lid 35 from an unexpected separation. The pawls 45 engage with the lower edge of the inner wall 25c of the cover main frame 25 (see FIG. 5) for preventing the lid 35 from being uncoupled upward away from the cover main frame 25.

As shown in FIGS. 4 and 7, a contacting wall 47 projecting toward the front hood 15 is integrally formed on the lid 35 as a contacting portion. The contacting wall 47 contacts with a under surface of the front hood 15 with interposing a sealing lip 49 therebetween. The sealing lip 49 is made of elastic material. Therefore, since the contacting wall 47 is confined by the front hood 15 incase where the lid 35 is to be uncoupled upward from the opening 26 of the cover main frame 25, the lid 35 is prevented from being uncoupled upward.

Note that the sealing lip 49 attached at an upper edge of the contacting wall 47 seals a gap between the upper edge and the under surface of the front hood 15 and thereby prevents heat and odor from intruding into a cowl box located at a rear-most section in the engine compartment 5.

Figure 8:
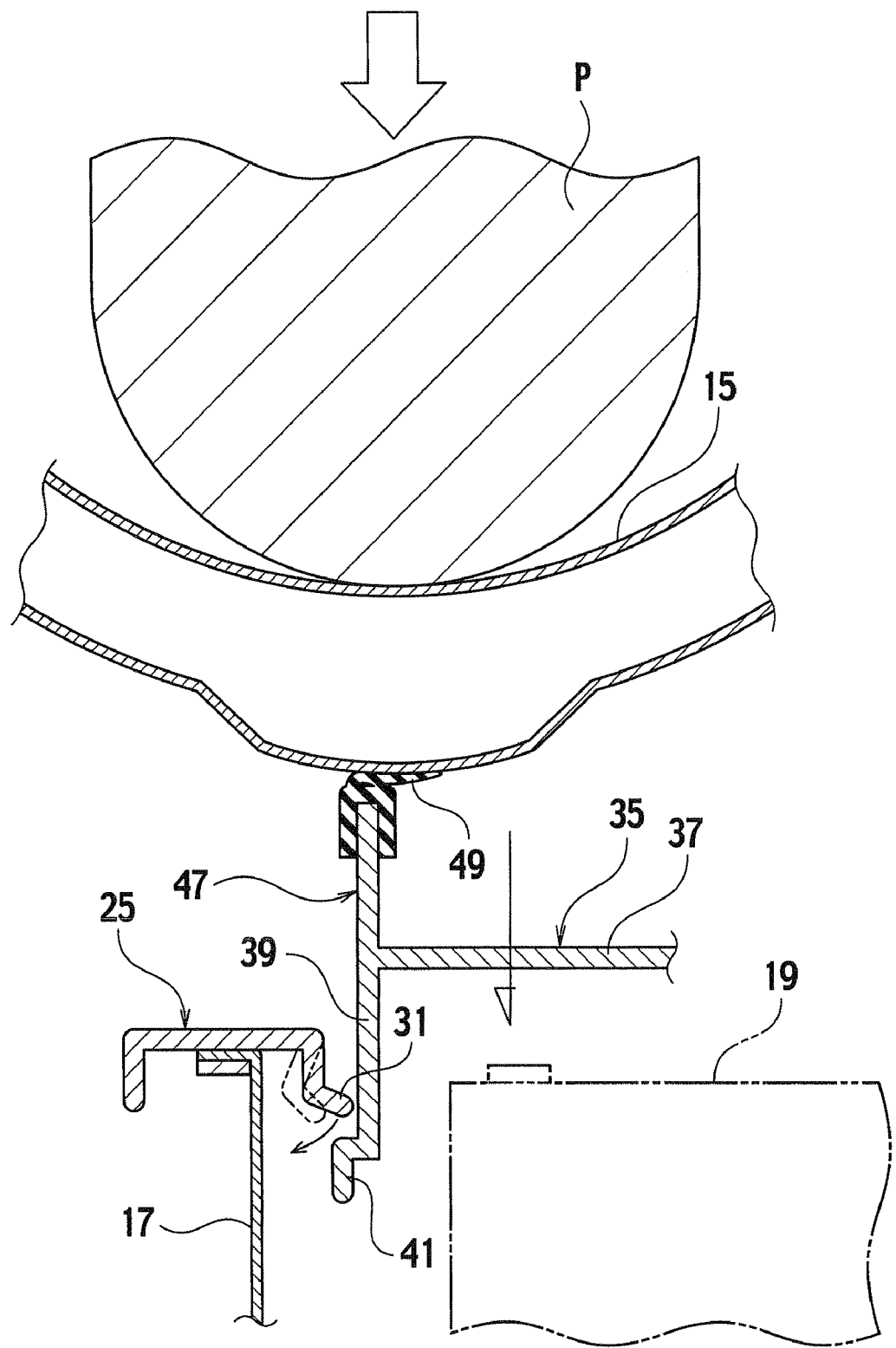
FIG. 8 is a cross-sectional view (state where an object runs on the front hood) taken along the line VII-VII shown in FIG. 3.

In the present embodiment, as shown in FIGS. 7 to 8, when a load equal-to or more-than a predetermined value has been applied to the contacting wall 47 of the lid 35 due to downward deformation of the front hood 15 at an object P running on the front hood 15, the tabs (supporting portions) 31 elastically deform and thereby their engagements with the foot wall (supported portion) 41 are released. As a result, the lid 35 drops off within the opening 26 of the cover main frame 25. Therefore, a bent amount of the front hood 15 can be increased and thereby an impact force to the object P can be reduced. Here, since the cover 23 (the cover main frame 25 and the lid 35) is not broken, the cover 23 can be installed again. Since the cover 23 can be re-used only by re-installation, maintaining costs can be reduced.

Hereinafter, advantages of the present embodiment are listed up.

(1) In the present embodiment, the cover 23 located between the front hood 15 and the vehicle component 19 includes the cover main frame 25 on which the opening 26 is formed, the lid 35 for covering the opening 26, the tabs 31 integrally provided on the cover main frame 25 and around the opening 26, the foot wall 41 integrally provided on the circumferential edge of the lid 35 and engaged with the tabs 31, and the contacting wall 47 upwardly projected from the lid 35 toward the front hood 15. The vehicle component 19 can be reached through the opening 26. The contacting wall 47 receives a downward load from the front hood 15 which has been bent downward. Then, at least one of a set of the tabs 31 and the foot wall 41 (the tabs 31 in the present embodiment) deforms elastically when a load equal-to or more-than a predetermined value has been applied to the contacting wall 47 of the lid 35 and thereby the one is released from an engagement with another (the foot wall 41 in the present embodiment). As a result, the lid 35 can drop off within the opening 26 of the cover main frame 25.

Since the lid 35 drops off within the opening 26 of the cover main frame 25 when the front hood 15 has been deformed downward at the object P running on the front hood 15, a bent amount of the front hood 15 can be increased and thereby an impact force to the object P had run on the front hood 15 can be reduced. Here, since the cover 23 (the cover main frame 25 and the lid 35) is not broken, the cover 23 can be installed again. Since the cover 23 can be re-used only by re-installation, maintaining costs can be reduced.

(2) In addition, in the present embodiment, the cover 23 further includes the sealing lip 49 attached at the upper edge of the contacting wall 47 for sealing the gap between the upper edge of the contacting wall 47 and the under surface of the front hood 15.

Since the front hood 15 contacts with the contacting wall 47 of the lid 35 with interposing the sealing lip 49 due to the downward bending of the front hood 15 at the object P running on the front hood 15, an impact load is not rapidly applied between the foot wall 41 of the lid 35 and the tabs 31 of the cover main frame 25. As a result, breakage of the lid 35 or the cover main frame 25 tends not to occur. In addition, since the gap between the upper edge of the contacting wall 47 and the under surface of the front hood 15 is sealed by the sealing lip 49, heat and odor are prevented from intruding into the cowl box located at the rear-most section in the engine compartment.

Next, another embodiment will be described. Note that similar configurations to the above embodiment are allocated with identical numerals to omit repetitive descriptions.

Second Embodiment

Figure 9:
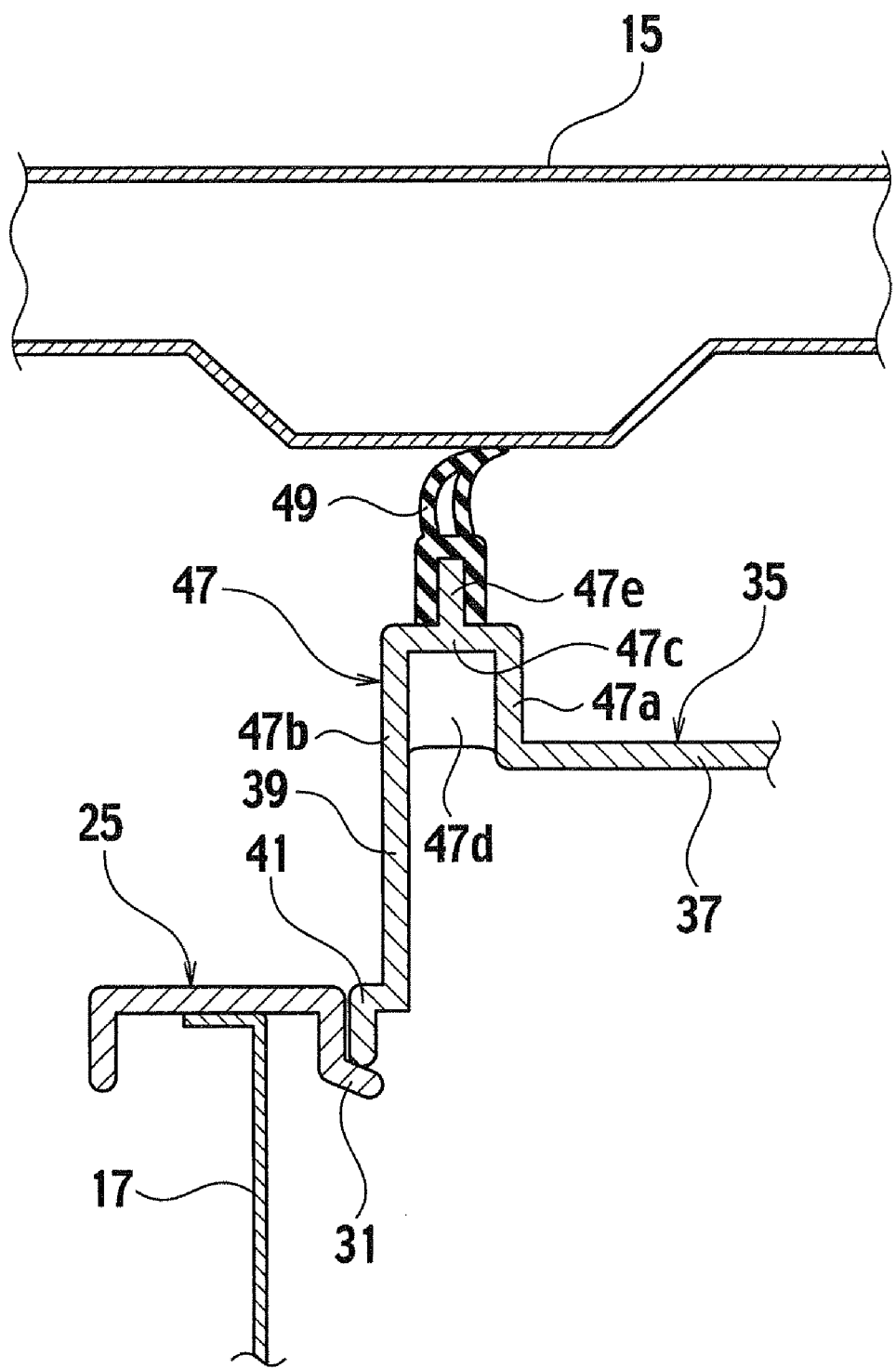
FIG. 9 is a cross-sectional view of a second embodiment corresponding to FIG. 7.

The cover in a second embodiment is shown in FIG. 9.

Although the contacting wall 47 of the lid 35 has a single-wall structure in the cover 23 of the first embodiment, the contacting wall 47 has a double-wall structure in the cover 23 of the second embodiment. This is a different point between the first and second embodiments.

Specifically, in the second embodiment, the contacting wall 47 has the double-wall structure which is composed of an inner wall 47*a*, an outer wall 47*b* provided parallel to the inner wall 47*a* and an upper wall 47*c* connecting upper edges of the inner wall 47*a* and the outer wall 47*b*. Ribs 47*d* are provide between the inner wall 47*a* and the outer wall 47*b* at intervals. Each of the ribs 47*d* is perpendicular to the inner wall 47*a* and the outer wall 47*b* and is bridged between the inner wall 47*a* and the outer wall 47*b*. A rib wall 47*e* is projected upward from an upper surface of the upper wall 47*c*. The sealing lip 49 is attached at an upper edge of the rib wall 47*e*.

According to the above-described second embodiment, the same advantages are achieved as those in the first embodiment. Especially, the above configuration of the second embodiment is effective for improving stiffness of the contacting wall 47.

Third Embodiment

Figure 10:
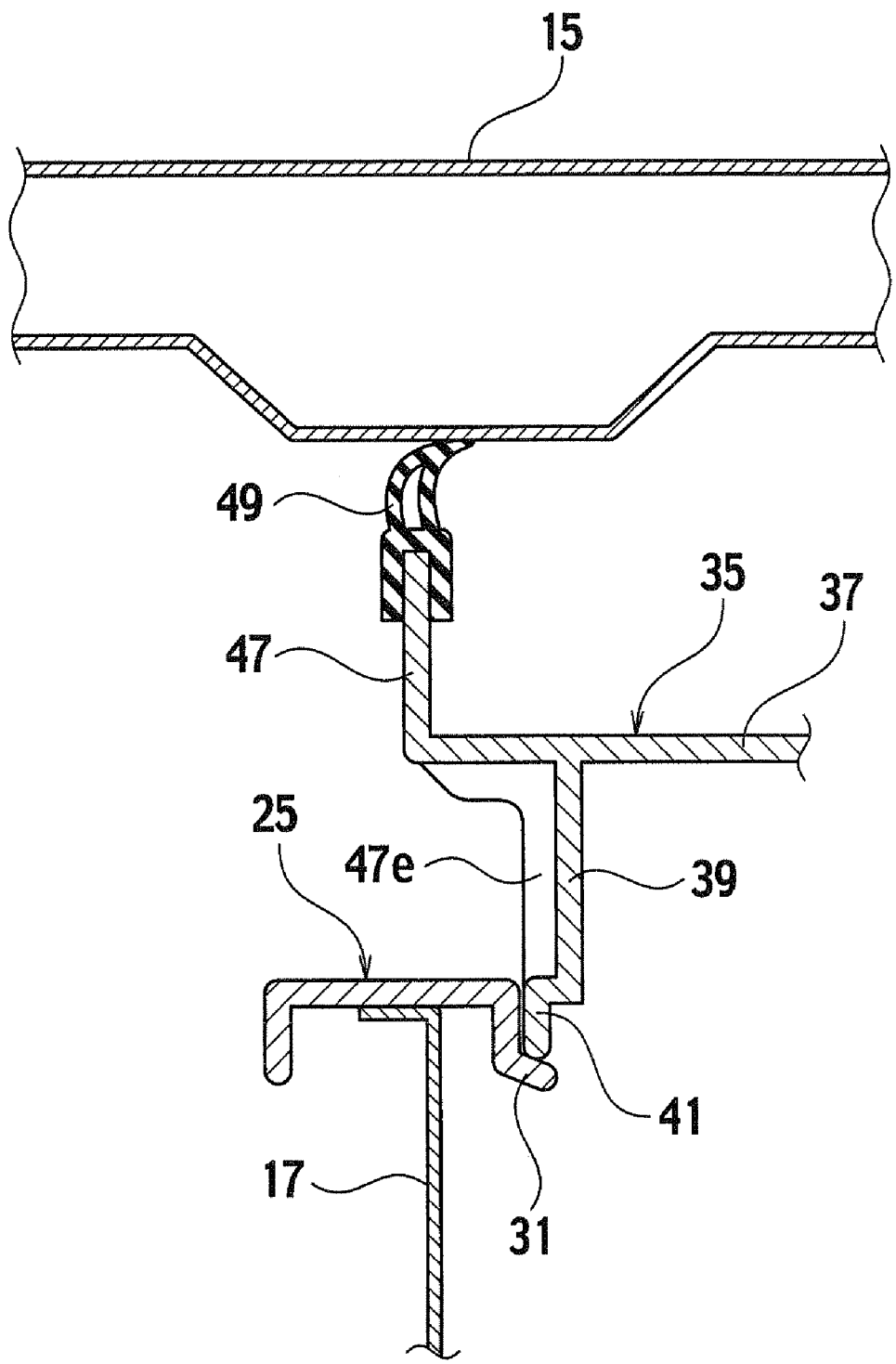
FIG. 10 is a cross-sectional view of a third embodiment corresponding to FIG. 7.

The cover in a third embodiment is shown in FIG. 10.

Although the contacting wall 47 of the lid 35 extends along an extension of the circumferential wall 39 of the lid 35, the contacting wall 47 extends with being offset with the extension of the circumferential wall 39 in the cover 23 of the third embodiment. This is a different point between the first and third embodiments.

Specifically, in the cover 23 of the third embodiment, the top panel 37 extends circumferentially outward from the upper edge of the circumferential wall 39. The contacting wall 47 is projected upward from an outer circumferential edge of the top panel 37 and thereby the contacting wall 47 is offset with the circumferential wall 39. In addition, ribs 47*e* are provide at intervals from the outer surface of the circumferential wall 39 to an outside circumferential under surface of the top panel 37.

According to the above-described third embodiment, the same advantages are achieved as those in the first embodiment. Especially, the above configuration of the third embodiment achieves an advantage of locating flexibility of the contacting wall 47.

As described above, according to the present invention, since the lid 35 drops off within the opening 26 of the cover main frame 25 when a load equal-to or more-than a predetermined value has been applied onto the lid 35 via the contacting wall 47 due to downward deformation of the front hood 15 at an object P running on the front hood 15, a bent amount of the front hood 15 can be increased and thereby an impact force to the object P can be reduced. Here, since the cover 23 (the cover main frame 25 and the lid 35) is not broken, the cover 23 can be installed again. Since the cover 23 can be re-used only by re-installation, maintaining costs can be reduced.

Note that, although the present invention has been described with reference to the above embodiments, the present invention is not limited only to the above embodiments.

For example, in the above embodiments, the engagements between the tabs (supporting portions) 31 of the cover main frame 25 and the foot wall (supported portion) 41 of the lid 35 are released by the elastic deformations of the tabs 31 when a load has been applied to the lid 35. However, the engagement between the supporting portion(s) and the supported portion (s) may be released by the elastic deformations of the supported portion(s).

Figure 11:
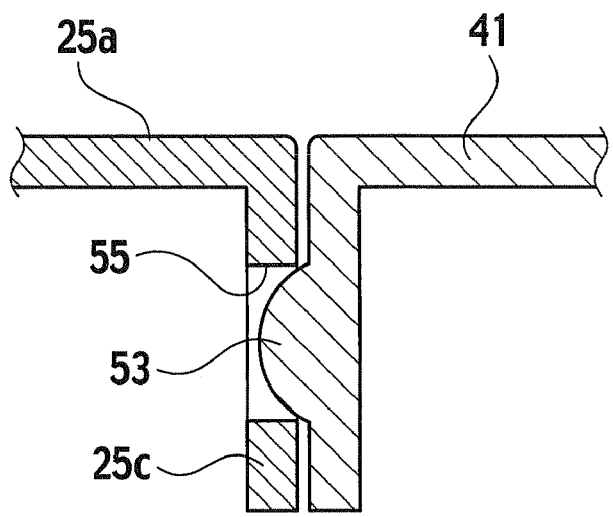
FIG. 11 is a cross-sectional view along a line XI-XI shown in FIG. 12 showing a first modified example of an anti-separation structure for the cover.
Figure 12:
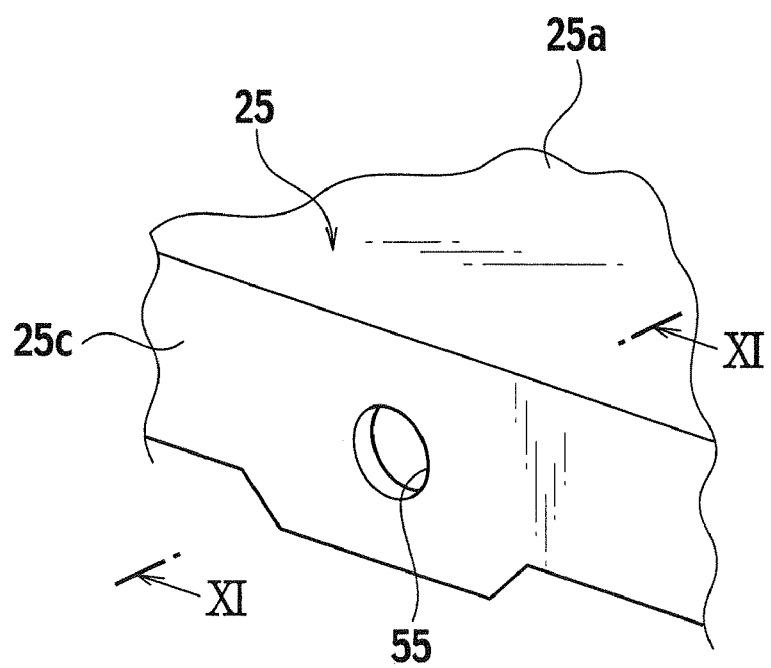
FIG. 12 is a perspective view showing a hole in the anti-separation structure in the first modified example.

In addition, in the above embodiments, the anti-separation structure of the lid 35 is achieved by the engagements between the pawls 45 provided on the snap tabs 43 projecting downward from the lower edge of the circumferential wall 39 of the lid 35 and the tabs 31 of the cover main frame 25. However, the anti-separation structure of the lid 35 may be achieved by engagements between hemispherical protrusions 53 provided on the outer circumferential surface of the foot wall 41 of the lid 35 and circular through holes 55 provided on the inner wall 25*c* of the cover main frame 25 as shown in an first modified example shown in FIGS. 11 and 12. Each pair of the protrusions 53 and the through holes 55 is made face-to-face. The protrusions 53 and the holes 55 may be provided conversely. The through holes 55 may be formed as recesses.

Figure 13:
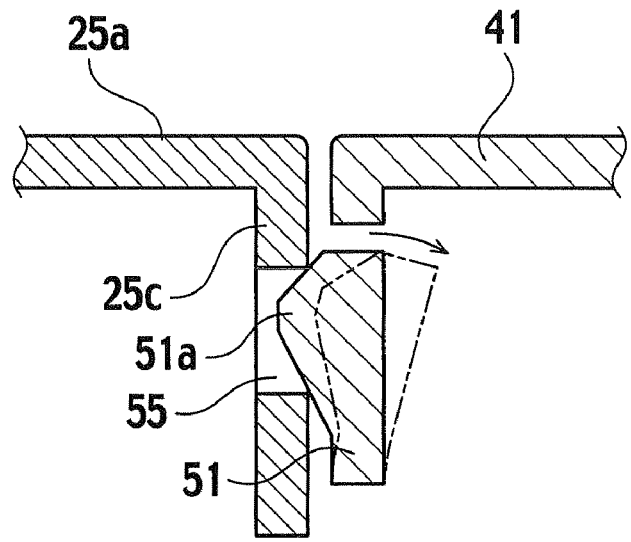
FIG. 13 is a cross-sectional view along a line XIII-XIII shown in FIG. 14 showing a second modified example of an anti-separation structure for the cover.
Figure 14:
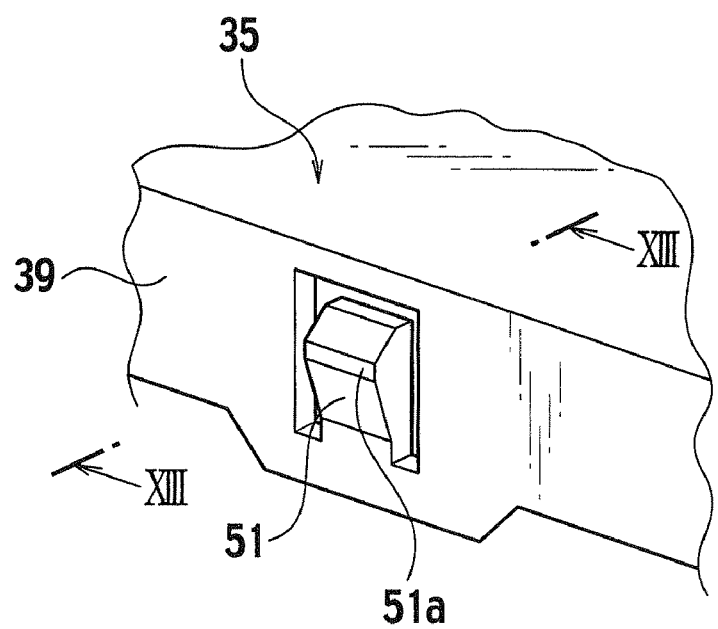
FIG. 14 is a perspective view showing a tab in the anti-separation structure in the second modified example.

Alternatively, the anti-separation structure of the lid 35 may be achieved by engagements between pawls 51*a* of tabs 51 integrally provided with the circumferential wall 39 of the lid 35 and rectangular (or square) through holes 55 provided on the inner wall 25*c* of the cover main frame 25 as shown in an second modified example shown in FIGS. 13 and 14. Each pair of the protrusions 53 and the through holes 55 is made face-to-face. The tabs 51 and the holes 55 may be provided conversely. The through holes 55 may be formed as recesses. Furthermore, the anti-separation structure may be achieved by other configurations.

The present invention can take various modified configurations within a scope of the technical idea of the present invention.

What is claimed is:

1. A cover provided between a front hood and a vehicle component provided beneath the front hood for covering the vehicle component, the cover comprising:
   a cover main portion on which an opening is formed, the vehicle component capable of being reached through the opening;
   a lid for covering the opening;
   a supporting portion integrally provided on the cover main portion and around the opening;

a supported portion integrally provided on a circumferential edge of the lid for being engaged with the supporting portion; and a contacting portion upwardly projected from the lid toward the front hood, the contacting portion being to receive a downward load from the front hood, wherein at least one of the supporting portion and the supported portion deforms elastically to drop off the lid within the opening in case where a load equal-to or more-than a predetermined value has been applied to the contacting portion.

2. The cover according to claim 1, further comprising:

a sealing lip attached at an upper edge of the contacting portion for sealing a gap between the upper edge of the contacting portion and an under surface of the front hood.

3. A front section structure of a vehicle body, comprising:

a front hood for covering a front compartment of the vehicle body; and a cover as claimed in claim 1, wherein the contacting portion is contacted with an under surface of the front hood directly or indirectly.

4. The front section structure according to claim 3, wherein the cover further comprises a sealing lip attached at an upper edge of the contacting portion for sealing a gap between the upper edge of the contacting portion and the under surface of the front hood, and the contacting portion is contacted with the under surface of the front hood with interposing the sealing lip.

* * * * *